[19] Miro

[11] Patent Number: 4,831,000
[45] Date of Patent: May 16, 1989

[54] CATALYST COMPOSITION FOR PREPARING HIGH DENSITY OR LINEAR LOW DENSITY OLEFIN POLYMERS OF CONTROLLED MOLECULAR WEIGHT DISTRIBUTION

[75] Inventor: Nemesio D. Miro, North Brunswick, N.J.

[73] Assignee: Mobil Oil Corporatiion, New York, N.Y.

[21] Appl. No.: 144,821

[22] Filed: Jan. 15, 1988

[51] Int. Cl.$^4$ ............................................. C08F 4/64
[52] U.S. Cl. ................................. 502/110; 502/113; 526/116
[58] Field of Search ............... 502/110, 113, 119, 125, 502/126

[56] References Cited

U.S. PATENT DOCUMENTS

| | | | |
|---|---|---|---|
| 3,412,174 | 11/1968 | Kroll | 502/117 X |
| 3,899,477 | 8/1975 | Altemore et al. | 260/94.9 |
| 3,956,255 | 5/1976 | Ort | 526/352 |
| 4,333,851 | 6/1982 | Speakman et al. | 502/113 |
| 4,530,913 | 7/1985 | Pullukat et al. | 502/125 X |
| 4,578,374 | 3/1986 | Best | 502/115 |
| 4,579,834 | 4/1986 | Best | 502/115 |
| 4,579,835 | 4/1986 | Best | 502/120 |
| 4,593,009 | 6/1986 | Nowlin | 502/107 |
| 4,607,019 | 8/1986 | Best | 502/119 |
| 4,634,751 | 1/1987 | Best | 526/129 |

*Primary Examiner*—Patrick P. Garvin
*Attorney, Agent, or Firm*—Alexander J. McKillop; Charles J. Speciale; Stanislaus Aksman

[57] ABSTRACT

There is disclosed a catalyst composition for the polymerization of olefins, particularly alpha-olefins. The composition is prepared by synthesizing a catalyst precursor and then combining it with a conventional catalyst activator. The precursor is synthesized by: (a) contacting a solid, porous carrier with an aluminum compound; (b) contacting the resulting product with a mixture of vanadium and titanium compounds; (c) contacting the product with an ether; and, (d) pre-activating the product of step (c) with a mixture of a halogenating agent and an aluminum compound.

The catalyst composition is used without a halogenating agent in the polymerization medium to produce narrow molecular weight distribution HDPE and LLDPE products, or with a halogenating agent in the polymerization medium to produce broad molecular weight distribution LLDPE and HDPE products.

52 Claims, No Drawings

CATALYST COMPOSITION FOR PREPARING HIGH DENSITY OR LINEAR LOW DENSITY OLEFIN POLYMERS OF CONTROLLED MOLECULAR WEIGHT DISTRIBUTION

BACKGROUND OF THE INVENTION

1. Field of the Invention

The invention relates to a catalyst composition for polymerizing olefins, particularly alpha-olefins, a method for producing such a catalyst and to a method of polymerizing olefins with such a catalyst. More particularly, the invention relates to a high activity catalyst composition which can be used to produce either high density, high molecular weight olefin polymers, or linear, low density polyolefins, both having molecular weight distribution which can be varied by the polymerization process conditions. The invention is also directed to a polymerization process utilizing such a catalyst composition.

2. Description of the Prior Art

Linear low density polyethylene (LLDPE) polymers possess properties which distinguish them from other polyethylene polymers, such as ethylene homopolymers. Certain of these properties are described by Anderson et al, U.S. Pat. No. 4,076,698. The LLDPE polymers are usually prepared from alpha-olefins in the presence of catalysts commonly referred to as Ziegler or Ziegler-Natta catalysts. Such catalysts usually contain various combinations of a magnesium compound, a compound of a transition metal, e.g., titanium or vanadium, and a co-catalyst, e.g., an aluminum alkyl.

Graff, U.S. Pat. No. 4,173,547, Stevens et al, U.S. Pat. No. 3,787,384, Strobel et al, U.S. Pat. No. 4,148,754, and Ziegler, deceased, et al, U.S. Pat. No. 4,063,009, each describe various polymerization processes suitable for producing forms of polyethylene other than linear low density polyethylene.

Stevens et al, U.S. Pat. No. 3,787,384, and Strobel et al, U.S. Pat. No. 4,148,754, describe catalysts prepared by first reacting a support (e.g., silica containing reactive hydroxyl groups) with an organomagnesium compound (e.g., a Grignard reagent) and then combining this reacted support with a tetravalent titanium compound.

Ziegler, deceased, et al, U.S. Pat. No. 4,063,009, describe a catalyst which is the reaction product of an organomagnesium compound (e.g., an alkylmagnesium halide) with a tetravalent titanium compound. The reaction of the organomagnesium compound with the tetravalent titanium compound takes place in the absence of a support material.

Thus, catalyst used for producing LLDPE resins usually contain a transition metal or a compound thereof and magnesium or a compound thereof. Such catalysts are intended for the production of LLDPE polymers having relatively low density (0.930 g/cc or less) and narrow molecular weight distribution (low MFR), since low MFR values are thought to be responsible for good strength properties of the films made from such polymers.

With some catalysts disclosed in the patents and publications discussed below, high yields of good quality, high molecular weight, polymers of ethylene and other olefins may be produced. Generally, these are linear polymers of high density, i.e., 0.930 g/cc and above, referred to in the art as high density polyethylene (HDPE), with the molecular weight of the polymers falling within a wide range of 2,000 to 300,000 or more. The density and molecular weight characteristics of these polymers render them satisfactory for many uses and they have, in fact, in recent years found extensive commercial use in a variety of applications. However, the polymer products obtained are not always suitable for specialty uses because they do not have the desired molecular weight distribution. Generally, high density and high molecular weight polymers are preferred for their superior strength characteristics. However, such polymers tend to have narrow molecular weight distribution (as evidenced by low values of melt flow ratio, MFR,) and relatively low values of high load melt index ($I_{21}$) which renders them difficult and expensive to process, i.e., they require a high extrusion pressure for processing, thereby resulting in low productivity and high cost per unit of product. Therefore, it is desirable to provide a catalyst producing high density, low $I_{21}$ polymers having comparatively broad molecular weight distribution (high MFR) since such polymers can be easily processed and they have satisfactory strength properties.

A vanadium-containing catalyst, used in conjunction with triisobutylaluminum as a co-catalyst, is disclosed by W. L. Carrick et al, in *Journal of American Chemical Society*, Volume 82, page 1502 (1960) and Volume 83, page 2654 (1961).

Altemore et al, U.S. Pat. No. 3,899,477, disclose a catalyst comprising a titanium halide, a vanadium halide and an organoaluminum compound. The catalyst is admixed with a mixture of an alkylaluminum sesquiethoxide and a trialkylaluminum prior to the use thereof in the polymerization of ethylene to produce high molecular weight and broad molecular weight distribution polymers. The catalyst may be supported on a support by preparing a solution or a slurry thereof and admixing it thoroughly with the support.

Ort, U.S. Pat. No. 3,956,255, discloses a supported catalyst composition made by depositing on a previously-treated silica gel a compound of vanadium, a trialkyl aluminum, and an alkylaluminum alkoxide. The silica is treated with an alkylaluminum, and alkylaluminum alkoxide or mixtures thereof to provide a catalyst of high activity.

Best, U.S. Pat. No. 4,607,019, discloses an olefin polymerization catalyst composition producing high molecular weight and broad molecular weight distribution polyolefins comprising a vanadium-containing catalyst component and an aluminum alkyl co-catalyst. The vanadium-containing catalyst component is prepared by contacting an inert support with an organoaluminum compound, a halogenating agent and a vanadium compound.

Best, U.S. Pat. Nos. 4,579,835 and 4,634,751, disclose vanadium-based olefin polymerization catalyst compositions comprising a support material, treated with an organoaluminum compound, an alkyl halide and a vanadium compound, activated with an alkylaluminum cocatalyst.

Best, U.S. Pat. Nos. 4,578,374 and 4,579,834, disclose vanadium- and magnesium-containing supported olefin polymerization catalyst compositions.

Thus, heretofore two separate and distinct catalytic systems were necessary for the production of either the HDPE or the LLDPE products. It would be desirable, however, to provide a single catalyst composition capable of producing either the HDPE or the LLDPE products.

SUMMARY OF THE INVENTION

The catalyst composition of this invention contains no magnesium or compounds thereof and it can produce either HDPE or LLDPE products with controlled molecular weight distribution (MWD), depending on the polymerization reaction conditions.

A supported olefin, particularly alpha-olefin, polymerization catalyst composition is obtained by synthesizing a precursor composition and then combining it with a catalyst activator, also known as a co-catalyst. The precursor composition is synthesized in a multi-step process summarized below. In the first step, a solid, porous carrier is contacted with an aluminum compound of the formula $$R_k AlZ_{(3-k)} \quad (I)$$

where Z is a halogen, R is a $C_1$–$C_{10}$ alkyl group and k is 1, 2 or 3. In the second step, the resulting product is contacted with a mixture of a vanadium compound of the formula $$VO_m X_{(n-2m)} \quad (II)$$

where X is a halogen, m is 0 or 1 and n is 2, 3, 4 or 5, and a titanium compound of the formula $$TiX_4' \quad (III)$$

where X' is a halogen. In the third step, the product is contacted with an alkyl ether having 2 to 6 carbon atoms, an alkyl/aryl ether having 2 to 18 carbon atoms or a silane ether of the formula.

$$R''Si(OR''')_m R_{(3-m)}^{IV} \quad (IV)$$

where R", R''' and $R^{IV}$ are the same or different alkyl or aryl groups and m is 1, 2 or 3. In the fourth step, the product of the third step is pre-activated (pre-reduced) by contacting it with a mixture of a halogenating agent, such as chloroform, carbon tetrachloride, or freon, and an aluminum compound of the formula $$R_{n'} AlX_{(3-n)}'' \quad (V)$$

where R' is a $C_1$–$C_{10}$ alkyl group, X" is a halogen and n is 1, 2 or 3. All of the catalyst synthesis steps (the contacting steps), including the pre-reduction step, are preferably conducted in the presence of a suitable solvent, e.g., a non-polar solvent, such as an alkane. The aluminum compounds of formulae (I) and (V), the vanadium compound, the titanium compound, the ethers and the halogenating agent must be liquids or they must be soluble in the solvent used in the synthesis.

The resulting catalyst precursor is then combined with a conventional co-catalyst (also known as a catalyst activator), e.g., one or more aluminum alkyls, to form an active catalyst composition.

The catalyst composition is used without a halogenating agent in the polymerization reactor to produce narrow molecular weight distribution HDPE or LLDPE products or with a halogenating agent to produce broad molecular weight distribution LLDPE or HDPE products. The amount of the halogenating agent can be adjusted to produce polymers having a wide range of molecular weight distribution.

DETAILED DESCRIPTION OF THE INVENTION

Carrier Materials

Suitable carriers are any solid support materials used to support alpha-olefin polymerization catalyst compositions. Such carriers are preferably solid, inorganic, porous materials, such as silica, alumina and combinations thereof, which contain reactive OH groups. The carrier materials may be amorphous or crystalline.

Examples of suitable carrier materials are described by Graff, U.S. Pat. No. 4,173,547, and by Stevens et al, U.S. Pat. No. 3,781,636, the entire contents of both of which are incorporated herein by reference. Polymeric silicas, known as polysiloxanes, can also be used as suitable carrier materials.

The carrier materials may be in the form of particles having a particle size of from about 0.1 micron to about 200 microns, more preferably from about 10 to about 150 microns. Preferably, the carrier is in the form of spherical particles, e.g., spray-dried silica. The internal porosity of the carriers is larger than 0.2 $cm^3/gr$, preferably larger than about 0.6 $cm^3/gr$. The specific surface area of the carriers is larger than about 50 $m^2/gr$, preferably it is about 150 to 1500 $m^2/gr$. In the most preferred embodiment, the carrier is silica which has been dehydrated by fluidizing it with air and heating at about 600° C. for about 8 to 10 hours to achieve a surface hydroxyl groups concentration of about 0.7 millimoles/gram (mmols/gr). The silica of the most preferred embodiment is a high surface area, amorphous silica (surface area of about 330 $m^2/gr$; pore volume of about 1.50 $m^3/gram$), and it is a material available under the tradename of Davison 955 from the Davison Chemical Division of W. R. Grace and Company. The silica is in the form of spherical particles, e.g., as obtained by a spray-drying process.

Internal porosity of the carriers can be determined by a BET-technique, described by S. Brunauer, P. Emmett and E. Teller in *Journal of the American Chemical Society*, 60, pp. 209–319 (1938). Specific surface area of carriers can also be measured in accordance with the aforementioned BET-technique, with the use of the standardized method, as described in British Standards BS 4359, Volume 1, (1969).

It is desirable to remove physically bound water from the carrier material prior to contacting the material with water-reactive magnesium compounds. The water removal step may be accomplished by heating the carrier material in an oxygen-containing gas to a temperature of from about 100° C. to an upper limit of temperature represented by the temperature at which a change of state or sintering occurs. Suitable temperatures are from about 100° C. to about 1000° C., preferably from about 750° C. to about 850° C., and most preferably about 800° C.

Chemically bound water, e.g., as represented by the presence of the OH groups on the carrier, may be present on the carrier. Excess OH groups may be removed by heating the carrier, prior to the use thereof in the catalyst synthesis method of this invention for a sufficient time at a sufficient temperature to acomplish the desired degree of the OH groups removal. For example, a relatively small number of OH groups may be removed by heating the carrier from about 150° C. to about 250° C., whereas a relatively large number of OH groups may be removed by sufficient heating at at least 500° C. or 600° C., preferably from about 750° C. to about 850° C. The heating is continued for about 4 to about 16 hours. The amount of the hydroxyl groups in silica may be determined according to the method disclosed by J. B. Peri and L. L. Hensley, Jr., in *J. Phys. Chem.* 72 (8), 2926 (1968), the entire contents of which are incorporated herein by reference.

While heating is the most preferred means of removing the OH groups inherently present in many carriers, such as silica, the OH groups may also be removed by other removal means, such as chemical means. For example, a desired proportion of OH groups may be reacted with a suitable chemical agent, such as a hydroxyl reactive aluminum compound, e.g., triethylaluminum.

Catalyst Precursor Synthesis

The carrier is contacted with an aluminum compound of the formula $$R_k AlZ_{(3-k)} \qquad (I)$$

where R is a $C_1$-$C_{10}$ alkyl group, preferably a $C_2$-$C_5$ alkyl group, Z is a halogen, and k is 1, 2 or 3. Suitable aluminum compounds are any aluminum compositions known and used as Ziegler-Natta co-catalysts or activators which are defined by the compounds of formula (I). Mixtures of such compounds may also be used in this step. Specific examples of aluminum compounds useful in the first catalyst synthesis step are trimethylaluminum, triethylaluminum, tripropylaluminum, triisopropylaluminum, tributylaluminum, triisobutylaluminum, tripentylaluminum, tri-n-hexylaluminum, triheptyl aluminum, diethylaluminum chloride and ethylaluminum dichloride. The most preferred aluminum compound is triethylaluminum (TEAL). The amount of the aluminum compound is such that the molar ratio of aluminum (Al), derived from the aluminum compound, per weight unit of the carrier is about 0.6 to about 1.0, preferably about 0.80 to about 1.0, and most preferably about 0.90 to about 1.0 mmoles of Al per gram (g) of carrier. The preferred method of contacting the carrier with the aluminum compound of formula (I) comprises initially forming a slurry of the carrier in a non-polar solvent, and then adding thereto a solution of the aluminum compound in the non-polar solvent. The slurry is then preferably brought to a reflux temperature and refluxed for a sufficient time to complete the reaction of the aluminum compound with the carrier.

Subsequently, the slurry is preferably allowed to cool, usually to ambient temperature, and it is then contacted with a mixture of the vanadium compound and the titanium compound. Preferably, the mixture of the vanadium and titanium compounds is homogenized before it is used to contact the slurry. The vanadium compound has the formula $$VO_m X_{(n-2m)} \qquad (II)$$

where X is a halogen, preferably Br or Cl, and most preferably Cl, m is 0 or 1, preferably 1, and n is 2, 3, 4 or 5, preferably 5. The most preferred vanadium compound is vanadium oxytrichloride, $VOCl_3$.

The titanium compound has the formula $$TiX_4' \qquad (III)$$

where X' is a halogen, preferably Cl.

The mixture is also preferably added to the slurry as a solution in a non-polar solvent. After the mixture is added to the slurry, the resulting slurry is preferably brought to a reflux temperature and refluxed for a sufficient time to substantially completely react the carrier of the first synthesis step with the titanium and vanadium compounds.

The amount of the vanadium compound is such that the molar ratio of the elemental vanadium (V), derived from the vanadium compound, per weight unit of the carrier is about 0.3 to about 1.0 mmole of V per gram of the carrier, preferably about 0.6 to about 1.0 mmole of V per gram of the carrier. The amount of the titanium compound is such that the molar ratio of the elemental titanium (Ti), derived from the titanium compound, per unit weight of the carrier is about 0.05 to about 0.7, preferably about 0.1 to about 0.25 mmole of Ti per gram of the carrier.

The resulting product is contacted with an alkyl ether having 2 to 18 carbon atoms, an alkyl/aryl ether or a silane ether of the formula $$R''Si(OR''')_m R_{(3-m)}^{IV} \qquad (IV)$$

where R'', R''' and $R^{IV}$ are the same or different alkyl or aryl groups, preferably R'' is an aryl groups and R''' and $R^{IV}$ are the same or different $C_1$-$C_4$ alkyl groups, and m is 1, 2 or 3. Preferred alkyl or alkyl/aryl ethers are cyclic alkyl ethers of 2-7 carbon atoms, such as tetrahydrofuran and lower alkyl/aryl ethers, such as phenylmethyl ether, and preferred silane ethers are silane ethers containing lower alkyl groups, such as phenyltrimethoxy silane and phenyldimethoxymethyl silane. The most preferred ethers are tetrahydrofuran or phenyltrimethoxysilane. The amount of the ether is about 0.5 to about 1.3, preferably about 0.75 to about 1.0 mmoles of an alkyl or alkyl/aryl ether per gram of the carrier, and from about 0.25 to about 1.0, preferably about 0.25 to about 0.5 mmole, of a silane ether per gram of the carrier. The ether is also preferably added in the form of a solution thereof in a non-polar solvent. The resulting slurry is preferably brought to a reflux temperature and refluxed for a sufficient time to react substantially all of the ether with the heretofore-synthesized catalyst precursor intermediate. Subsequently, the solvent is removed, e.g., by decantation or evaporation, to obtain a dry, solid catalyst precursor. All of the catalyst precursor synthesis steps are conducted at about 25° to about 95° C.

Pre-Activation of Catalyst Precursor

The resulting solid is then pre-activated. The preactivation procedure comprises contacting the solid with a mixture of a halogenating agent and an aluminum compound of the formula $$R_n' AlX_{(3-n)}'' \qquad (V)$$

where R' is a $C_1$-$C_{10}$ alkyl group, X'' is a halogen and n is 1, 2 or 3.

In the aluminum compound of formula (V), R' is preferably a $C_1$-$C_5$ alkyl group, and more preferably a $C_2$-$C_4$ alkyl group and halogen is preferably Cl or Br, most preferably Cl. Thus, suitable aluminum compounds of formula (V) are methylaluminum dichloride or dibromide, dimethylaluminum chloride or bromide, ethylaluminum dichloride or dibromide, diethylaluminum chloride or bromide, propylaluminum dichloride or dibromide, dipropylaluminum chloride or bromide, n-butylaluminum dichloride or dibromide, di-n-butylaluminum chloride or bromide, iso-butylaluminum dichloride or dibromide, di-iso-butylaluminum chloride or bromide, n-hexylaluminum dichloride or dibromide, di-n-hexylaluminum chloride or bromide, n-octylaluminum chloride or bromide, and di-n-octylaluminum chloride or bromide. If the catalyst composition is intended to be used for the polymerization of LLDPE resins, diethylaluminum chloride (DEAC) or triethylaluminum (TEAL) are preferred compounds of formula (V), with DEAC being the most preferred. If the catalyst composition is intended to be used for the polymerization of HDPE resins, DEAC or TEAL are the preferred compounds of formula (V), although any of the other aforementioned compounds defined by that formula may also be used.

The halogenating agent has the empirical formula

$$MH_nX_{(p-n)}''' \qquad (VI)$$

where M is Si, C, Ge or Sn, preferably Si or C, and most preferably C, X''' is a halogen, preferably Cl or Br, and most preferably Cl, n is 0, 1, 2 or 3, and p is the valence of M. Suitable halogenating agents are methylene chloride, chloroform, carbon tetrachloride, dichlorosilane, trichlorosilane and silicon tetrachloride. When M is C, halogenated hydrocarbons containing 1 to 6 carbon atoms can be used, such as those identified by tradenames of Freon 11, 12, 14, and Freon 114, available frm E. I. DuPont de Nemours and Co. The most preferred halogenating agent is chloroform, $CHCl_3$.

The relative molar ratios of the aluminum compound of formula (V) to the halogenating agent are about 0.133:1 to about 7.5:1, preferably about 0.5:1 to about 2:1 and most preferably about 1:1. The pre-activation step is preferably conducted by preparing a homogeneous solution of the aluminum compound of formula (V) and the halogenating agent in a non-polar solvent and contacting the solid product of the catalyst precursor synthesis procedure with the solution. Care must be taken when mixing aluminum trialkyls, especially trimethyl- and triethyl-aluminum with highly chlorinated hydrocarbon components since a potential explosion may occur. Optionally, higher alpha-olefins, e.g., n-butene, n-hexene or n-octene, may be used, in addition to the halogenating agent and the aluminum compound, during the pre-activation procedure. If used, the amount of higher alpha-olefins is about 1 to about 10 ml per gram of the carrier.

Without wishing to be bound by any theory of operability, it is believed that the pre-activation step is crucial to activate the titanium polymerization center of the catalyst precursor to provide an active catalyst composition for the production of LLDPE resins without the use of a halogenating agent during the polymerization step.

In all of the aforementioned catalyst precursor synthesis steps and the pre-activation step, preferably the same non-polar solvent is used in each step, but different, yet compatible non-polar solvents may also be used. The term "compatible" in relation to polar solvents is used herein to define solvents which can be safely combined with each other as pure solvents or as slurries of any of the reactants discussed above in such solvents without causing a detrimental chemical reaction between the solvents or the slurries.

Suitable non-polar solvents are materials in which the compounds of formulae (I)-(V) and the halogenating agent of formula (VI) are at least partially soluble and which are liquid at the catalyst precursor synthesis temperature. Preferred non-polar solvents are alkanes, such as hexane, n-heptane, octane, nonane and decane, although a variety of other materials including cycloalkanes, such as cyclohexane, aromatics, such as benzene and ethylbenzene, may also be used. The most preferred non-polar solvent is hexane. Prior to use, the non-polar solvent should be purified, such as by percolation through silica gel and/or molecular sieves, to remove traces of water, oxygen, polar compounds, and other materials capable of adversely affecting catalyst activity.

Catalyst Activation

The supported, pre-activated catalyst precursor, formed in the multi-step catalyst synthesis procedure described above, is activated with suitable activators, also known as promoters. The activators are known in the art and they include any of the materials commonly employed as promoters for olefin polymerization catalyst components containing at least one compound of the elements of Groups IB, IIA, IIB, IIIB and IVB of the Periodic Chart of the Elements, published by Fisher Scientific Company, Catalog Number 5-702-10, 1978. Examples of such promoters are metal alkyls, hydrides, alkylhydrides, and alkyhalides, such as alkyllithium compounds, dialkylzinc compounds, trialkylboron compounds, trialkylaluminum compounds, alkylaluminum halides and hydrides, and tetraalkylgermanium compounds. Mixtures of such compounds may also be employed. Specific examples of useful promoters include n-butyllithium, diethylzinc, di-n-propylzinc, triethylboron, triethylaluminum, triisobutylaluminum, tri-n-hexylaluminum, ethylaluminum dichloride, dibromide, and dihydride, isobutylaluminum dichloride, dibromide, and dihydride, diethylaluminum chloride, bromide, and hydride, di-n-propylaluminum chloride, bromide, and hydride, diisobutylaluminum chloride and hydride, tetramethylgermanium, and tetraethylgermanium. Organometallic promoters which are preferred in this invention are Group IIIB metal alkyls and dialkylhalides having 1 to about 20 carbon atoms per alkyl radical. More preferably, the promoters is a trialkylaluminum compound having 1 to about 6 carbon atoms per alkyl radical. The most preferred promoter is trimethylaluminum, if the catalyst is used to produce LLDPE resins; however triethylaluminum (TEAL) may also be used for such applications. If the catalyst is used to produce HDPE resins, TEAL is the most preferred promoter. Other promoters which can be used herein are disclosed by Stevens et al, U.S. Pat. No. 3,787,384, column 4, line 45 to column 5, line 12, and by Strobel et al, U.S. Pat. No. 4,148,754, column 4, line 56 to column 5, line 59, the entire contents of both patents being incorporated herein by reference.

The organometallic promoter is employed in an amount which is at least effective to promote the polymerization activity of the solid component of the catalyst of this invention. Preferably, at least about three moles of the promoter are employed per mole of the sum of elemental titanium (Ti) and vanadium (V), derived from the titanium and vanadium compounds, respectively, on the solid catalyst component, although higher ratios, such as 10:1, 25:1, 100:1 or higher, are also suitable and often give highly beneficial results.

The catalyst may be activated in situ by adding the activator and catalyst separately to the polymerization medium. It is also possible to combine the catalyst and the activator before the introduction thereof into the polymerization medium, e.g., for up to about 2 hours prior to the introduction thereof into the polymerization medium at a temperature of from about −40° to about 100° C. It is preferred, however, to activate the catalyst in situ, in the polymerization medium.

It is notable that the catalyst of this invention is synthesized on a support which does not require an alkoxide activator, e.g., an alkylaluminum sesquiethoxide, nor the use of alkyl halides during the synthesis and it is prepared in the absence of magnesium compounds. As is known to those skilled in the art, magnesium compounds were previously considered necessary to produce LLDPE polymerization catalysts with an acceptable level of activity. It is therefore surprising that the catalyst of this invention exhibits a high level of activity for the production of LLDPE in the absence of magnesium compounds.

Polymerization

Olefins, expecially alpha-olefins, may be polymerized with the catalysts of this invention by any suitable process. Such processes include polymerizations carried out in suspension, in solution or in the gas phase. Gas phase polymerization reactions are preferred, e.g., those taking place in stirred bed reactors and, especially, fluidized bed reactors.

If the catalyst of this invention is used to polymerize alpha-olefins to LLDPE or HDPE resins with narrow molecular weight distribution (MWD), the polymerization is conducted in a conventional manner without the addition of a halogenating agent into the polymerization reactor. However, if the catalyst is used to produce LLDPE or HDPE resins with broad MWD, a halogenating agent must be added to the polymerization reaction to increase the MFR values, and thus broaden the molecular weight distribution of the resins. The halogenating agent is the same agent as is used in the catalyst precursor pre-activation step, i.e., the halogenating agent having the empirical formula (VI). The most preferred halogenating agent used during the polymerization reaction is chloroform ($CHCl_3$). The amount of the halogenating agent used in the polymerization reaction is about 0 to about 65 ppm to obtain medium MWD polymers (MFR of about 25 to about 80, preferably about 45 to about 70) and about 90 to about 300 ppm to obtain very broad MWD polymers (MFR of about 80 to about 120, preferably about 80 to about 110). These amounts are based on the content of the halogenating agent in the total amount of the solvent used in slurry polymerizations, or on the total bed weight of gas-phase polymerization reactions.

The molecular weight of the polymer may be controlled in a known manner, e.g., by using hydrogen. With the catalysts produced according to the present invention, molecular weight may be suitably controlled with hydrogen when the polymerization is carried out at relatively low temperatures, e.g., from about 30° to about 105° C. This control of molecular weight may be evidenced by a measurable positive change in melt index ($I_2$) of the polymer produced.

The HDPE polymers are prepared by polymerizing ethylene, optionally with small amounts of higher alpha-olefins, such as n-butene, n-hexene or n-octene in the presence of the catalyst of this invention. Suitable amounts of higher alpha-olefins to ethylene are about 0.020 to about 0.05 mole ratio of higher alpha-olefins to ethylene. The LLDPE polymers are prepared by polymerizing ethylene with higher alpha-olefins, such as n-butene, n-hexene or n-octene in the presence of the catalyst of this invention. For the LLDPE polymers, the mole ratio of higher alpha-olefins to ethylene is about 0.130 to about 0.250. The molecular weight distribution of both, the LLDPE and the HDPE, polymers made with the catalyst of this invention can be varied by varying the amounts of a halogenating agent used during the polymerization process. The higher the amount of a halogenating agent, the broader the molecular weight distribution (the higher the MFR value). Thus, the polymers may have MFR values ranging from about 26 to about 120, depending on the amount of a halogenating agent present during polymerization reaction. The HDPE polymers prepared in the presence of the catalysts of this invention have a density of about 0.940 to about 0.965 g/cc, and $I_2$ values of about 0.1 to about 100. As is known to those skilled in the art, such MFR values are indicative of a relatively broad molecular weight distribution of the polymers. As is also known to those skilled in the art, such MFR values are indicative of the polymers especially suitable for high density and medium density, high molecular weight film applications since such polymers offer superior toughness, stiffness, and tensile strength properties as compared to LLDPE polymers which are better known for their excellent tear strength and puncture resistant properties. MFR is defined herein as the ratio of the high load melt index (HLMI or $I_{21}$) divided by the melt index ($I_2$), i.e., $$MFR = I_{21}/I_2$$

Low MFR values indicate relatively narrow molecular weight distribution and high MFR values relatively broad molecular weight distribution of the polymers.

The LLDPE polymers have a density of about 0.900 to about 0.930 g/cc and $I_2$ values of about 0.20 to about 100. Such polymers are useful for the production of high strength film and injection molding products. Copolymers prepared with the catalyst of this invention may have two monomeric units or they may be terpolymers having three monomeric units. Particular example of such polymers include ethylene/1-butene copolymers, ethylene/1-hexene copolymers, ethylene/1-octene copolymers, ethylene/4-methyl-1-pentene copolymers, ethylene/1-butene/1-hexene terpolymers, ethylene/propylene/1-hexene terpolymers and ethylene/propylene/1-butene terpolymers. When propylene is employed as a comonomer, the resulting polyethylene polymer preferably has at least one other alpha-olefin comonomer having at least four carbon atoms in an amount of at least 1 percent by weight of the polymer. Accordingly, ethylene/propylene copolymers are possible, but not preferred. The most preferred comonomer is 1-hexene.

A particularly desirable method for producing LLDPE polymers according to the present invention is in a fluid bed reactor. Such a reactor and means for operating it are described by Levine et al, U.S. Pat. No. 4,011,382, Karol et al, U.S. Pat. No. 4,302,566, and Nowlin et al, U.S. Pat. No. 4,481,301, the entire contents of all of which are incorporated herein by reference. The polymer produced in such a reactor contains catalyst particles since the catalyst is not separated from the polymer.

The catalysts prepared according to the present invention are highly active and may have an activity of at least about 4000 grams of polymer per gram of catalyst per 100 psi of ethylene in one hour of about 1.45 million grams polymer per gram of titanium per 100 psi of ethylene in one hour.

The following Examples further illustrate some features of the invention. However, it will be apparent to those skilled in the art that the specific reactants and reaction conditions used in the Examples do not limit the scope of the invention.

The properties of the polymers produced in the Examples were determined by the following test methods:

| | |
|---|---|
| Density | ASTM D-1505 - A plaque is made and conditioned for one hour at 100° C. to approach equilibrium crystallinity. Measurement for density is then made in a density gradient column; reported as gms/cc. |
| Melt Index (MI), $I_2$ | ASTM D-1238 - Condition E - Measured at 190° C. - reported as grams per 10 minutes (gms/10 min). |
| Melt Extrusion Rate, $I_5$ | ASTM D-1238 - Condition G, using 5000 grams weight. |
| Melt Extrusion Rate, $I_{10}$ | ASTM D-1238 - Condition N, using 1000 grams weight. |
| High Load Melt Index (HLMI, $I_{21}$) | ASTM D-1238 - Condition F - Measured at 10 times the weight used in the melt index test above. |
| Melt Flow Ratio (MFR) = | $\frac{I_{21}}{I_2}$ |
| Productivity | The polymer after each polymerization is dried in a vacuum oven and productivity is calculated by dividing the polymer weight times 100 by weight of catalyst used, partial pressure of ethylene and the length of polymerization in hours. |

EXAMPLE 1

(Catalyst Synthesis)

(A) Catalyst Precursor Synthesis

The preparation was conducted under nitrogen atmosphere. 527 grams of Davison 955 silica (previously calcined at 600° C. for 16 hours under a purge of dry nitrogen) was placed in a 7.6 liter, nitrogen purged flask containing 2.6 liters of dry isopentane. While agitating the silica slurry at room temperature, 342.6 mls of a 1.5M triethylaluminum (TEAL) solution in hexane (527.6 mmoles TEAL) was added. The mixture was brought to 60° C. and stirred for one hour and then was cooled to 40° C. A mixture comprised of 11.6 ml $TiCl_4$ (105.3 mmoles) and 50.0 ml $VOCl_3$, which was prepared in 200 ml dry hexane solvent in a stainless steel container, was added to the silica slurry. The final slurry was brought to 65° C. and stirred for 1.5 hours. Then, 42.8 mls tetrahydrofuran (526.4 mmoles) was added into the reaction flask, and agitation was continued for an additional hour. The solvent was removed by evaporation under nitrogen, yielding 637 grams of a purple-coloured, free-flowing product. The product contained 0.79% wt. of Ti.

(B) Pre-Activation of Catalyst Precursor

Under nitrogen, 267.0 grams of the precursor of step (A) was placed in a 3-liter, 3-neck flask, fitted with nitrogen purge and a mechanical stirrer. The flask was filled half-way with dry hexane, then a mixture of 138.0 mls of a 1.45M diethylaluminum chloride (DEAC) in hexane solution (200.1 mmoles) and 16.0 mls of chloroform (198.4 mmoles), prepared in an addition flask containing 250 mls of dry hexane, was added to the flask. The slurry was brought to reflux temperature and was stirred for 90 minutes. The solvent was decanted, and the remaining solids were dried under nitrogen at 75° C. Yield: 271 grams of a brown-colored product.

EXAMPLE 2

(Catalyst Synthesis with 1-Octene in Pre-Activation Step)

A catalyst composition similar to that of Example 1 was prepared, except that 1-octene was used in the pre-activation step to decrease the rate of polymerization, since there was concern that the catalyst of Example 1 may produce polymers with non-uniform properties due to its high rate of initial polymerization.

(A) Catalyst Precursor Synthesis

The preparation was conducted under nitrogen atmosphere. 343 grams of Davison grade 955 silica, available from W. R. Grace and Co., Davison Chemical Division, Baltimore, MD (previously calcined at 600° C. for 16 hours under a purge of dry nitrogen) was placed in a 3-liter, 3-neck flask, fitted with a mechanical stirrer, an oil bubbler and/or an addition funnel. About 1.5 liter of dry hexane was introduced into the flask, and the slurry was stirred while adding 345 mmoles of triethylaluminum (225 mls of 1.54M TEAL in a hexane solution). The slurry was refluxed for one hour and then the flask was removed from the hot oil bath to cool to room temperature. In an addition funnel there was mixed 208 mls of hexane, 32.4 mls $VOCl_3$ (342 mmoles), and 9.4 mls of $TiCl_4$ (85.5 mmoles). The mixture was added slowly into the flask, and the slurry was refluxed for 90 minutes. The flask was cooled to room temperature, and then a solution of 28.0 mls of tetrahydrofuran (THF) in 100 mls of hexane (228 mmoles of THF) was added to the flask while stirring the slurry. After refluxing the final slurry for one hour, the solids were allowed to settle and then the solvent was decanted. The solid was dried under nitrogen at 85° C. The yield was 442 grams of a purple, free-flowing, solid product.

(B) Pre-Activation (Pre-Reduction) of the Catalyst Precursor

Under nitrogen atmosphere, 4.0 grams of catalyst precursor (A) was placed in a 200-ml, septum-capped, pressure vessel containing a magnetic stir bar. This was designated bottle A. Into a similar vessel, bottle B, there was added 75 mls of dry hexane, 3.0 mmoles TEAL solution, 5 mls dried octene-1, and 2.5 mmoles of chloroform, $CHCl_3$ (0.20 ml). After mixing the contents in bottle B, the mixture was transferred into the bottle A, while stirring the catalyst slurry. Bottle A was kept in a 75° C. oil bath and was stirred for one hour. Bottle A was then removed from the bath and was stirred while allowing it to cool to room temperature. The solid was allowed to settle and the solvent was decanted into a tared beaker with a magnetic stirrer bar. The solvent was evaporated until a constant weight was obtained. The remaining 1.35 g of a sticky material in the beaker indicated the formation of polyoctene. The solid in Bottle A was dried by purging with nitrogen while in a hot (75° C.) bath. This preparation yielded 4.1 g of a brown-purple, free-flowing activated product. The product contained 0.927% wt of Ti.

EXAMPLES 3-9

(Catalyst Synthesis)

Various modifications of the catalyst of Example 2 were prepared in Examples 3-9 to determine the effect of various reactants on the catalyst composition and the polymerization properties thereof.

In Example 3, the pre-activated catalyst precursor was prepared substantially as in Example 2, except that no chloroform was used during the pre-reduction step (B) to determine the effect of the chloroform in that step on the catalyst.

In Example 4, the pre-activated catalyst precursor was prepared substantially as in Example 2, except that diethylaluminum chloride (DEAC) was used instead of the TEAL in the pre-activation step.

In Example 5 the pre-activated catalyst precursor was prepared substantially as in Example 2, except that trichloroethanol, $Cl_3CCH_2OH$, was used instead of the chloroform in the pre-activation step to determine the effect of halogenating agents other than the chloroform on the catalyst properties.

In Example 6, a catalyst precursor was prepared substantially as in Example 2(A), but no $TiCl_4$ or any other sources of titanium (Ti) was used in the synthesis to determine the effect of Ti on the catalyst properties.

In Example 7, the catalyst precursor of Example 6 was pre-activated in substantially the same manner as in Example 2(B).

In Example 8, a catalyst precursor was prepared in substantially the same manner as in Example 2(A), except that: (a) no $VOCl_3$ or other source of vanadium (V) was used in the synthesis; (b) 50% (i.e., 172.5 mmoles) of the TEAL; and (c) 25% (i.e., 57.0 mmoles) of the amount of the THF used in the Example 2(A) precursor synthesis was used in Example 8.

In Example 9, the precursor of Example 8 was pre-activated in substantially the same manner as in Example 2(B).

EXAMPLE 10

(Precursor Preparation)

In Example 10, the catalyst precursor was prepared substantially as in Example 1(A), except for the amounts of the reagents and the use of phenyltrimethoxysilane (PhSi(OMe)$_3$) in place of the tetrahydrofuran. The preparation used 10.0 grams of silica, 9.0 mmoles of TEAL, 6.0 mmoles of $VOCl_3$ mixed with 0.10 mmole $TiCl_4$, 0.25 mmole of PhSi(OMe)$_3$, 0.75 mmole of DEAC mixed with 0.75 mmole of $CHCl_3$. The preparation yielded 14.5 grams of a free-flowing, purple-colored product, which contained 0.33% wt. of Ti. Subsequently, the catalyst precursor was pre-activated substantially in the manner of Example 1(B).

EXAMPLE 11

(HDPE Preparation Without Chloroform)

The catalyst precursor of Example 2(A) was evaluated in a two (2) gallon slurry polymerized reactor using hexane as a diluent. Triethylaluminum (TEAL) was used as a catalyst activator (co-catalyst).

Three liters (1) of pure, dry hexane at 25°-35° C. was added into the reactor, followed by 200 mls of hexene-1, and then 8.0 mls of 1.45 molar (M) TEAL solution in hexane. The mixture was heated to 85° C. and a sufficient amount of hydrogen ($H_2$) was added to give $H_2$ partial pressure in the reactor of 9 psi. Then, 0.2117 gram (g) of the precursor of Example 2(A) was added to the reactor. Ethylene was continuously added to the reactor in a sufficient amount to maintain 202 psig total reactor pressure (or 166 psig ethylene partial pressure). The polymerization was conducted at 85° C. for 102 minutes, at which time the ethylene addition was terminated and the reactor was allowed to cool to ambient temperatures, and then the reactor pressure was relieved. The polymer slurry in hexane was siphoned out of the reactor and was transferred into a large dishpan where the solvent was allowed to evaporate after some polymer stabilizers had been added. The remaining polymer in the dishpan was put into a vacuum oven set at 75° C. to obtain 167 g of completely dry polymer. The productivity was 280 g PE/(g cat-hr-100 psi ethylene), melt index ($I_{21}$) was 0.41 g/10 min.

EXAMPLES 12-19

(Polymer Preparation Without Chloroform in Reactor)

A series of HDPE polymer samples was prepared substantially in the manner of Example 11, using the catalyst precursors and catalyst compositions of Examples 2-9. The polymerization results and some of the polymer properties are summarized in Table I, below.

TABLE 1

(HDPE Polymers - No Chloroform in the Reactor)

| Example | Catalyst of Example | Transition Metal Compounds on the Catalyst | Catalyst Pre-reduction Treatment (mmoles reagent/g cat. 1.25 ml/g cat) | Productivity (Grams PE/(g cat-hr- 100 psi ethylene) | $I_{21}$ | MFR | Density (g/cc) |
|---|---|---|---|---|---|---|---|
| 11 | 2 (A) | TiCl$_4$ & VOCl$_3$ | none | 280 | 0.41 | — | — |
| 12 | 2 (B) | TiCl$_4$ & VOCl$_3$ | 0.75 TEAL; 0.62 CHCl$_3$; 1-octene | 2340 | 6.39 | 31.2 | 0.944 |
| 13 | 3 | TiCl$_4$ & VOCl$_3$ | 0.75 TEAL; 1-octene | 1050 | 5.06 | 31.4 | 0.944 |
| 14 | 4 | TiCl$_4$ & VOCl$_3$ | 0.75 DEAC; 0.62 CHCl$_3$; 1-octene | 2450 | 4.99 | 24.9 | 0.942 |
| 15 | 5 | TiCl$_4$ & VOCl$_3$ | 0.75 DEAC; 0.75 Cl$_3$CCH$_2$OH; 1-octene | 1550 | 4.60 | 30.5 | 0.942 |

TABLE 1-continued (HDPE Polymers - No Chloroform in the Reactor)

| Example | Catalyst of Example | Transition Metal Compounds on the Catalyst | Catalyst Pre-reduction Treatment (mmoles reagent/g cat. 1.25 ml/g cat) | Productivity (Grams PE/(g cat-hr-100 psi ethylene) | $I_{21}$ | MFR | Density (g/cc) |
|---|---|---|---|---|---|---|---|
| 16 | 6 | $VOCl_3$ | none | 45 | 11.4 | 61.6 | — |
| 17 | 7 | $VOCl_3$ | 0.75 TEAL; 0.62 $CHCl_3$; 1-octene | 80 | 25.3 | 58.1 | — |
| 18 | 8 | $TiCl_4$ | none | 0 | — | — | — |
| 19 | 9 | $TiCl_4$ | 0.75 TEAL; 0.62 $CHCl_3$; 1-octene | 110 | 0.23 | — | — |

EXAMPLE 20

(HDPE Preparation With Chloroform)

The catalyst precursor of Example 2(A) was used in this Example to evaluate the utility thereof for the polymerization of HDPE resins. The evaluation was carried out in the slurry polymerization reactor of Example 11 using hexane as a diluent. Triethylaluminum (TEAL) was used as a catalyst activator.

Three liters (1) of pure, dry hexane at 25°-35° C. was added into the reactor, followed by 225 mls of hexene-1, 8.0 mls of 1.45 molar (M) TEAL solution in hexane and 0.25 ml of chloroform (3.1 mmoles). The mixture was heated to 85° C. and a sufficient amount of hydrogen ($H_2$) was added to give $H_2$ partial pressure in the reactor of 8 psi. Then, 0.1786 gram (g) of the precursor of Example 2(A) was added to the reactor. Ethylene was continuously added to the reactor in a sufficient amount to maintain 200 psig total reactor pressure (or 166 psig ethylene partial pressure). The polymerization was conducted at 85° C. for 65 minutes, at which time the ethylene addition was terminated, the reactor was allowed to cool to ambient temperature, and then the reactor pressure was relieved. The polymer slurry in hexane was siphoned out of the reactor and was transferred into a large dishpan where the solvent was allowed to evaporate after some polymer stabilizers had been added. The remaining polymer in the dishpan was put into a vacuum oven set at 75° C. to obtain 441 g of a completely dry polymer. The productivity was 1373 g PE/(g cat-hr-100 psi ethylene), melt index ($I_{21}$) was 7.23 g/10 min., and density 0.942 g/cc.

EXAMPLES 21-30

(HDPE Polymer Preparation With Chloroform in Reactor)

A series of HDPE polymer samples was prepared substantially in the manner of Example 20, using the catalyst precursors and catalyst compositions of Examples 2-9, in the presence of chloroform in the polymerization reactor. The polymerization results and some of the polymer properties are summarized in Table II below.

TABLE II (HDPE Polymers - Chloroform Present in the Reactor)

| Example | Catalyst of Example | Transition Metal Compounds on the Catalyst | Catalyst Pre-reduction Treatment (mmoles reagent/g cat, 1.25 ml/g cat) | Productivity (Grams PE/g cat-hr-100 psi ethylene) | $I_{21}$ | MFR | Density (g/cc) | Hexene-1 (ml) |
|---|---|---|---|---|---|---|---|---|
| 20 | 2 (A) | $TiCl_4$ & $VOCl_3$ | none | 1370 | 7.23 | 124 | 0.942 | 225 |
| 21 | 2 (A) | $TiCl_4$ & $VOCl_3$ | none | 1350 | 7.28 | 119 | 0.942 | 225 |
| 22 | 2 (B) | $TiCl_4$ & $VOCl_3$ | 0.75 TEAL; 0.62 $CHCl_3$; 1-octene | 1510 | 6.25 | 109 | 0.940 | 125 |
| 23 | 2 (B) Modified** | $TiCl_4$ & $VOCl_3$ | 1.78 TEAL; 1.00 $CHCl_3$; 1-octene | 1460 | 4.86 | 84.7 | 0.935 | 225 |
| 24 | 3 | $TiCl_4$ & $VOCl_3$ | 0.75 TEAL; 1-octene | 1390 | 3.78 | 104 | 0.942 | 75 |
| 25 | 4 | $TiCl_4$ & $VOCl_3$ | 0.75 DEAC; 0.62 $CHCl_3$; 1-octene | 1490 | 5.19 | 94.0 | 0.938 | 175 |
| 26 | 5 | $TiCl_4$ & $VOCl_3$ | 0.75 DEAC; 0.62 $Cl_3C$ $CH_2OH$; 1-octene | 1480 | 10.2 | 97.3 | — | 175 |
| 27 | 6 | $VOCl_3$ | none | 1250 | 6.86 | 125 | 0.938 | 225 |
| 28 | 7 | $VOCl_3$ | 0.75 TEAL; 06.2 $CHCl_3$; 1-octene | 1320 | 4.85 | 93.1 | 0.945 | 75 |
| 29 | 8 | $TiCl_4$ | none | 0 | — | — | 30 | — |
| 30 | 9 | $TiCl_4$ | 0.75 TEAL; 0.62 $CHCl_3$; 1-octene | 47 | 1.77 | — | — | 30 |

**The modification of the catalyst of Example 2, used in Example 23, consisted of the use of different amounts of TEAL and $CHCl_3$ in the pre-reduction treatment than in the catalyst of Example 2.

EXAMPLES 31-35

(LLDPE Products)

The catalyst composition of Example 4, activated with DEAC or trimethylaluminum (TMA), was used to prepare LLDPE polymers without chloroform in the polymerization reactor. The polymerization reaction was conducted in a 1.6-liter slurry polymerization reactor as described below.

The procedure was similar to the given in Example 11, except for the use of the following amounts of reagents: 450-500 mls hexane, 2.5 mls of 1.45M TEAL solution in hexane of 1.6 mls of 2.42M TMA solution in hexane, 200–250 mls hexene-1, 0.011–0.34 g catalyst precursor, and the ethylene partial pressure was kept between 89 to 97 psig.

The final, thoroughly dry polymer product was homogenized by roll milling the polymer at 154° C. Samples of the roll-milled polymer were used for density, melt flow indices, and melt flow ratio measurements. The results are summarized in Table III.

EXAMPLE 36

(LLDPE Products)

The pre-activated catalyst precursor of Example 10 was used to prepare LLDPE polymer without chloroform in the polymerization reactor. The polymerization reaction was conducted in a 2-gallon slurry polymerization reactor using 3-liters of hexane, 900 mls of hexene-1, 2 mls of 2.42M TMA solution in hexane, 0.0871 g of the precursor, and 104 psig ethylene partial pressure. The polymerization results are given in Table III. The activity of the catalyst per gram Ti was very high— about $1.5 \times 10^6$, and the MFR was very low.

TABLE III (LLDPE Polymerization Results Without Chloroform in Reactor)

| Example | Catalyst of Example | Co-Catalyst | Productivity (g PE/g cat-hr-100 psi ethylene) | Productivity $\times 10^6$ (g PE/g Ti-hr 100 psi etyhylene) | $I_2$ (g/10 min) | MFR | Density (g/cc) |
| --- | --- | --- | --- | --- | --- | --- | --- |
| 31 | 4 | TEAL | 3690 | 0.398 | 0.79 | 36.0 | 0.923 |
| 32 | 4 | TMA | 5220 | 0.563 | 0.47 | 27.0 | 0.920 |
| 33 | 4 | TMA | 5320 | 0.574 | 0.40 | 27.1 | 0.919 |
| 34 | 4 | TMA | 4965 | 0.536 | 0.69 | 28.0 | 0.920 |
| 35 | 4 | TMA | 5360 | 0.578 | 1.36 | 28.8 | 0.916 |
| 36 | 10 | TMA | 4815 | 1.459 | 0.67 | 25.5 | 0.914 |

EXAMPLE 37

(HDPE Preparation—No Chloroform in Reactor)

The catalyst composition of Example 1(B) was used to prepare LLDPE product, without chloroform in the reactor, in the manner and in the apparatus of Example 36. The results are summarized in Table IV, below.

TABLE IV (LLDPE Polymers - No Chloroform in the Reactor)

| Example | Catalyst of Example | Co-Catalyst | Productivity (g PE/g cat-hr-100 psi ethylene) | Productivity $\times 10^6$ (g/PE/g Ti-hr-100 psi ethylene) | $I_2$ (g/10 min) | MFR | Density (g/cc) |
| --- | --- | --- | --- | --- | --- | --- | --- |
| 37 | 1 | TMA | 3821 | 0.509 | 1.22 | 28.8 | 0.922 |

EXAMPLES 38–44

To demonstrate the ability of the catalyst to produce HDPE polymers of varying molecular weight distribution by varying the amounts of a halogenating agent in the polymerization reactor, the catalyst of Example 2(B) was used to polymerize ethylene with 1-hexene according to the procedure of Example 20 but using varying amounts of chloroform in the reactor. The results are given in TABLE V. Good catalyst productivity was maintained and the MFR increased from 31.2 to 109 with increasing amounts of chloroform.

TABLE V (HDPE Polymers With Controlled MWD - By Varying $CHCl_3$ Level)

| Example | Catalyst of Example | Chloroform In Reactor (ppm) | Productivity (g PE/g cat-hr-100 psi ethylene) | $I_2$ (g/10 min) | MFR | Density (g/cc) |
| --- | --- | --- | --- | --- | --- | --- |
| 38 | 2(B) | 0 | 2341 | 0.205 | 31.2 | 0.944 |
| 39 | 2(B) | 25 | 1447 | 0.063 | 47.3 | — |
| 40 | 2(B) | 35 | 1375 | 0.071 | 56.7 | 0.946 |
| 41 | 2(B) | 50 | 1452 | 0.047 | 66.7 | 0.946 |
| 42 | 2(B) | 87 | 1425 | 0.114 | 82.6 | 0.947 |
| 43 | 2(B) | 180 | 1522 | 0.057 | 109 | 0.940 |
| 44 | 2(B) | 310 | 1605 | 0.056 | 104 | 0.944 |

EXAMPLES 45–49

To compare the effect of the presence of a halogenating agent during the polymerization on a catalyst with and without $TiCl_4$, the catalyst of Example 7(B) was used to polymerize ethylene and 1-hexene according to the product of Example 20, but with varying amounts of chloroform added to the polymerization reactor. The results are given in Table VI. The productivity of the catalyst was unacceptably low at low chloroform levels, and the polymer MFR values were relatively higher than those of the invention catalyst at low chloroform levels indicating poor control of polymer MWD. Additionally, increasing the amounts of chloroform had no appreciable effect on the MFR values of the polymer.

TABLE VI

| Example | Catalyst of Example | Chloroform In Reactor (ppm) | Productivity (g PE/g cat-hr-100 psi ethylene) | $I_2$ | MFR | Density (g/cc) |
|---|---|---|---|---|---|---|
| 45 | 7(B) | 0 | 80 | 0.436 | 58.1 | — |
| 46 | 7(B) | 25 | 821 | 1.20 | 81.1 | 0.948 |
| 47 | 7(B) | 50 | 1012 | 1.44 | 76.5 | 0.947 |
| 48 | 7(B) | 87 | 1251 | 0.379 | 92.7 | 0.944 |
| 49 | 7(B) | 180 | 1318 | 0.052 | 93.1 | 0.945 |

EXAMPLES 50–51

(LLDPE Polymers Prepared With Chloroform)

These examples illustrate that the MFR values of the LLDPE polymer can also be increased by adding a halogenating agent, such as chloroform, to the reactor. The catalyst of Example 4, using the polymerization procedure of Example 36, was used in these Examples. The results are given in Table VII.

TABLE VII
(LLDPE Polymers With Controlled MWD - By Varing CHCl₃ Level)

| Example | Catalyst of Example | Chloroform In Reactor (ppm) | Productivity (g PE/g cat-hr-100 psi ethylene) | $I_2$ | MFR | Density (g/cc) |
|---|---|---|---|---|---|---|
| 50 | 4 | 0 | 4756 | 0.363 | 25.5 | 0.924 |
| 51 | 4 | 20 | 2840 | 2.08 | 43.9 | 0.908 |

The data of Table VII illustrates that chloroform in the polymerization reactor increases the MFR values of the LLDPE polymers.

Discussion Of Results

A. HDPE Polymerization With Chloroform in the Polymerization Step

It is known that vanadium-based Ziegler catalysts require chloroform or other chlorinated hydrocarbons as a modifier in the polymerization process to sustain better catalyst activity (e.g., see P. D. Smith et al, INORGANIC CHEMISTRY, 24, 2997 (1985)). The results of the HDPE polymerization using chloroform in the reactor show that the pre-reduction of both, the titanium- and vanadium-containing and the vanadium-only containing catalysts, slightly increased the catalyst productivity (compare Examples 20 with 22 or 27 with 28). The Ti-only containing catalyst which was not pre-reduced with chloroform, however, showed no activity (Example 29), while the pre-reduced version thereof gave very low productivity (Example 30). Thus, these results indicate that the pre-reduction is beneficial for improving the catalyst productivity.

Another important effect of the pre-reduction treatment is the improvement in the 1-hexene incorporation properties as shown by comparing polymers of Examples 20 and 23. Both polymers were prepared with the same amount of 1-hexene, but the polymer of Example 23, made with the pre-reduced catalyst, had lower density than that of Example 20, made with the same catalyst which was not pre-reduced.

The MFR values of the polymers slightly decreased after the pre-reduction. This is attributed to a loss of some high molecular weight polymer fractions, as indicated by lower polymer elasticity for polymers made with the pre-reduced catalysts.

B. Polymerization Without Chloroform

The polymerization results of Examples conducted without chloroform in the reactor indicate that the titanium- and vanadium-containing catalyst which was not pre-reduced showed very low productivity (Example 11), whereas the pre-reduced catalyst gave a very high productivity (Example 12). High productivities were also obtained with a DEAC-reduced catalyst in the presence of either chloroform or trichloroethanol (Examples 14 and 15). Without chloroform in the pre-reduction step, productivity decreased by 55% (compare Examples 12 and 13). These results show that the pre-reduction of the catalyst significantly improves the activity of the catalyst when it is used to polymerize olefins without chloroform in the reactor. They also indicate that chloroform in the pre-activation step treatment is needed for high productivity.

The HDPE polymers, particularly polymers prepared with the DEAC-reduced catalyst (Example 14), prepared without chloroform in the reactor have relatively low MFR values. Such MFR values are typical for titanium-containing Ziegler catalysts, but not for vanadium-based catalysts. These results therefore suggest that Ti is responsible for the activity in these catalysts. This is especially surprising since chloroform is required in the pre-reduction step to achieve higher activity, and chloroform is expected to be a poison for Ti-Ziegler catalysts.

The vanadium-only containing catalyst gave very low productivities for both, the pre-reduced and non-pre-reduced catalyst (Examples 16 and 17). In addition, the MFR values of these polymers are approximately twice as high as the MFR values of polymers made with the pre-reduced titanium- and vanadium-containing catalysts. These results suggest that the pre-reduction step activates the titanium centers but not the vanadium centers in the mixed Ti/V catalysts.

However, the fact that the titanium-only containing catalyst showed poor activity after the pre-reduction step (Example 19) is probably attributed to the lack of stabilizer support for the titanium metals in the catalyst. It is known in the art that Ti activity is enhanced in the presence of a stabilizer support, such as $MgCl_2$ or other magnesium compounds. Since there is no magnesium compound in the pre-reduced titanium- and vanadium-containing catalyst of this invention, the vanadium compound is likely to act as the stabilizer for the titanium active centers.

C. LLDPE From DEAC-Activated Catalyst

The HDPE polymers prepared without chloroform in the reactor had very low polymer MFR values, especially the polymers from the DEAC-pre-reduced catalyst (Example 14). This indicates that the novel catalyst of this invention may also produce LLDPE polymers with narrow molecular weight distribution (low MFR values) suitable for high strength film applications. LLDPE polymers were made with this catalyst and the results are summarized in Table III. Polymerization runs were made with both TEAL and trimethylaluminum (TMA) as a co-catalyst. Table III results indicate that the catalyst of this invention exhibits a substantially higher productivity when it is activated with TMA rather than with TEAL (compare Example 31 with 32), and that the MFR for the polymer prepared with the TMA-activated catalyst is much lower than that for the TEAL-activated catalyst, 27.0 versus 36 (Examples 31 and 32). The productivity of the catalyst of this invention per gram of Ti can be as high as $1.5 \times 10^6$ which compares very favorably with other MgCl$_2$-supported catalyst known in the art.

Since the catalyst composition of this invention is capable of producing polymers of widely varying densities—from about 0.900 to about 0.950 g/cc—and MFR values—from about 25 to about 120—it is extremely flexible and may replace the use of different catalytic systems for the production of different products. For example, chromium-based olefin polymerization catalysts (Phillips catalysts) were used in prior art to prepare HDPE polymers having broad molecular weight distribution (high MFR values), and transition metal- and magnesium-containing olefin polymerization catalysts (Ziegler catalysts) were used to prepare LLDPE and HDPE polymers of narrow molecular weight distribution (low MFR values). It is generally known in the art that two such distinct catalytic systems are incompatible and therefore cannot be readily used in the same reactor (e.g., consecutively), because of concerns that the traces of one catalyst may contaminate and deactivate the other catalyst. Accordingly, different reactors preferably had to be dedicated for the use of a given catalytic system. The catalyst of this invention, capable of producing polymer products of varying densities and MFR values, eliminates these concerns and, in effect, makes available to polymer manufacturers additional reactor capacity for a variety of products.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adopt it to various diverse applications.

I claim:

1. An olefin polymerization catalyst precursor composition prepared by:
   (a) contacting a solid, porous carrier with an aluminum compound of the formula $$R_kAlZ_{(3-k)} \qquad (I)$$

where R is a $C_1$–$C_{10}$ alkyl group, Z is a halogen and k is 1, 2 or 3;
   (b) contacting the products of step (a) with a mixture containing a vanadium compound of the formula $$VO_mX_{(n-2m)} \qquad (II)$$

where X is a halogen, m is 0 or 1, and n is 2, 3, 4 or 5, and a titanium compound of the formula $$TiX_4' \qquad (III)$$

where X' is a halogen;
   (c) contacting the product of step (b) with an ether selected from the group consisting of an alkyl ether having 2 to 18 carbon atoms, an alkyl/aryl ether having 2 to 18 carbon atoms, or a silane ether of the formula $$R''Si(OR''')_mR_{(3-m)}^{IV} \qquad (IV)$$

where $R''$, $R'''$ and $R^{IV}$ are the same or different alkyl or aryl groups and m is 1, 2 or 3;
   (d) pre-activating the product of step (c) with a mixture of a halogenating agent and an aluminum compound of the formula $$R_n'AlX_{(3-n)}'' \qquad (V)$$

where R' is a $C_1$–$C_{10}$ alkyl group, X'' is a halogen and n is 1, 2 or 3.

2. A catalyst precursor of claim 1 wherein R is a $C_2$–$C_5$ alkyl group.

3. A catalyst precursor of claim 2 wherein R is an ethyl group.

4. A catalyst precursor of claim 3 wherein X and X' are each the same or different and they are bromine or chlorine.

5. A catalyst precursor of claim 4 wherein X and X' are each chlorine.

6. A catalyst precursor of claim 5 wherein R' is a $C_2$–$C_5$ alkyl group.

7. A catalyst precursor of claim 6 wherein R' is an ethyl group.

8. A catalyst precursor of claim 7 wherein X'' is bromine or chlorine.

9. A catalyst precursor of claim 8 wherein the ether is a cyclic alkyl ether or a silane ether.

10. A catalyst precursor of claim 9 wherein the ether is a cyclic alkyl ether having 2 to 7 carbon atoms or a silane ether of the formula $$R''Si(OR''')_mR^{IV}$$

where $R''$, $R'''$, and $R^{IV}$ are the same or different alkyl or aryl groups and m is 1, 2 or 3.

11. A catalyst precursor of claim 10 wherein R'' is an aryl group and R''' and $R^{IV}$ are the same or different $C_1$–$C_4$ alkyl groups.

12. A catalyst precursor of claim 11 wherein the ether is tetrahydrofuran or phenyltrimethoxysilane.

13. A catalyst precursor of claim 12 wherein the halogenating agent is a silicon halide or a hydrocarbyl halide.

14. A catalyst precursor of claim 13 wherein the halogenating agent is a hydrocarbyl halide.

15. A catalyst precursor of claim 14 wherein the halogenating agent is carbon tetrachloride, chloroform, 1,1,1-trichloroethane, dichloromethane or trichlorofluoromethane.

16. A catalyst precursor of claim 15 wherein the halogenating agent is carbon tetrachloride or chloroform.

17. A catalyst precursor of claim 16 wherein the halogenating agent is chloroform.

18. A method of preparing an olefin catalyst precursor composition comprising the steps of:
(a) contacting a solid, porous carrier with an aluminum compound of the formula $$R_k AlZ_{(3-k)} \qquad (I)$$

where R is a $C_1$–$C_{10}$ alkyl group, Z is a halogen and k is 1, 2 or 3;
(b) contacting the product of step (a) with a mixture containing a vanadium compound of the formula $$VO_m X_{(n-2m)} \qquad (II)$$

where X is a halogen, m is 0 or 1, and n is 2, 3, 4 or 5, and a titanium compound of the formula $$TiX_4' \qquad (III)$$

wherein X' is a halogen;
(c) contacting the product of step (b) with an ether selected from the group consisting of an alkyl ether having 2 to 18 carbon atoms, an alkyl/aryl ether having 2 to 18 carbon atoms, or a silane ether of the formula $$R''Si(OR''')_m R_{(3-m)}^{IV} \qquad (IV)$$

where R", R''' and $R^{IV}$ are the same or different alkyl or aryl groups and m is 1, 2 or 3;
(d) pre-activating the product of step (c) with a mixture of a halogenating agent and an aluminum compound of the formula $$R_n' AlX_{(3-n)}'' \qquad (V)$$

where R' is a $C_1$–$C_{10}$ alkyl group, X" is a halogen and n is 1, 2 or 3.

19. A catalyst precursor of claim 3 wherein k is 3.

20. A catalyst precursor of claim 5 wherein the vanadium compound of the formula (II) is vanadium oxytrichloride.

21. A catalyst precursor of claim 20 wherein in the mixture used in said step (b), the molar ratio of the elemental vanadium (V), derived from the vanadium compound of the formula (II), per unit weight of the carrier is about 0.3 to about 1.0 mmoles of V per gram of the carrier, and the molar ratio of the element titanium (Ti), derived from the titanium compound of the formula (III), per unit weight of the carrier is about 0.05 to about 0.7 mmoles of Ti per gram of the carrier.

22. A catalyst precursor of claim 21 wherein the molar ratio of V per unit weight of the carrier is about 0.6 to about 1.0 mmole of V per gram of the carrier and the molar ratio of Ti per unit weight of the carrier is about 0.1 to about 0.25 mmole of Ti per gram of the carrier.

23. A catalyst precursor of claim 22 wherein the molar ratio of V of Ti is 5:1.

24. A catalyst precursor of claim 12 wherein the ether is tetrahydrofuran.

25. A catalyst precursor of claim 24 wherein the amount of the tetrahydrofuran is about 0.5 to about 1.3 mmoles per gram of the carrier.

26. A catalyst precursor of claim 25 wherein the amount of the tetrahydrofuran is about 0.75 to about 1.0 mmoles per gram of the carrier.

27. A catalyst precursor of claim 26 wherein the molar ratio of the tetrahydrofuran to V is about 1.0.

28. A method of claim 18 wherein R is a $C_2$–$C_5$ alkyl group.

29. A method of claim 28 wherein R is an ethyl group.

30. A method of claim 29 wherein k is 3.

31. A method of claim 30 wherein X and X' are each the same or different and they are bromine or chlorine.

32. A method of claim 31 wherein X and X' are each chlorine.

33. A method of claim 32 wherein the vanadium compound of the formula (II) is vanadium oxytrichloride.

34. A method of claim 33 wherein in the mixture used in said step (b), the molar ratio of the elemental vanadium (V), derived from the vanadium compound of the formula (II), per unit weight of the carrier is about 0.3 to about 1.0 mmoles of V per gram of the carrier, and the molar ratio of the elemental titanium (Ti), derived from the titanium compound of the formual (III), per unit weight of the carrier is about 0.05 to about 0.7 mmoles of Ti per gram of the carrier.

35. A method of claim 34 wherein the molar ratio of V per unit weight of the carrier is about 0.6 to about 1.0 mmole of V per gram of the carrier and the molar ratio of Ti per unit weight of the carrier is about 0.1 to about 0.25 mmole of Ti per gram of the carrier.

36. A method of claim 35 wherein the molar ratio of V to Ti is 5:1.

37. A method of claim 36 wherein R' is a $C_2$–$C_5$ alkyl group.

38. A method of claim 37 wherein R' is an ethyl group.

39. A method of claim 38 wherein X" is bromine or chlorine.

40. A method of claim 39 wherein the ether is a cyclic alkyl ether or a silane ether.

41. A method of claim 40 wherein the ether is a cyclic alkyl ether having 2 to 7 carbon atoms or a silane ether of the formula $$R''Si(OR''')_m R^{IV}$$

where R", R''', and $R^{IV}$ are the same or different alkyl or aryl groups and m is 1, 2 or 3.

42. A method of claim 41 wherein R" is an aryl group and R''' and $R^{IV}$ are the same or different $C_1$–$C_4$ alkyl groups.

43. A method of claim 42 wherein the ether is tetrahydrofuran or phenyltrimethoxysilane.

44. A method of claim 43 wherein the ether is tetrahydrofuran.

45. A method of claim 44 wherein the amount of the tetrahydrofuran is about 0.5 to about 1.3 mmoles per gram of the carrier.

46. A method of claim 45 wherein the amount of the tetrahydrofuran is about 0.75 to about 1.0 mmoles per gram of the carrier.

47. A method of claim 46 wherein the molar ratio of the tetrahydrofuran to V is about 1.0.

48. A method of claim 47 wherein the halogenating agent is a silicon halide or a hydrocarbyl halide.

49. A method of claim 48 wherein the halogenating agent is a hydrocarbyl halide.

50. A method of claim 49 wherein the halogenating agent is carbon tetrachloride, chloroform, 1,1,1-trichloroethane, dichloromethane or trichlorofluoromethane.

51. A method of claim 50 wherein the halogenating agent is carbon tetrachloride or chloroform.

52. A method of claim 51 wherein the halogenating agent is chloroform.

* * * * *

UNITED STATES PATENT AND TRADEMARK OFFICE
CERTIFICATE OF CORRECTION

PATENT NO. : 4,831,000

DATED : May 16, 1989

INVENTOR(S) : Nemesio D. Miro

It is certified that error appears in the above-identified patent and that said Letters Patent is hereby corrected as shown below:

Col. 7, line 29     delete "frm" and insert --from--.

Col. 15 & 16, Table II, Col. 4 Corresponding Example 28     delete "06.2" and insert --0.62--.

Col. 15 & 16, Table II, Col. 8, Corresponding to Example 29     delete "30".

Col. 15 & 16, Table II, Col. 9 Corresponding to Example 29     insert --30--.

Col. 16, line 65     before "given" insert --one--.

Col. 19, line 45     delete "polymerization" and insert --polymerizations--.

Col. 22, line 42     delete "$C_2-C_5$ alkyl" and insert --$C_2-C_5$ alkyl--.

Signed and Sealed this

Fourth Day of September, 1990

Attest:

HARRY F. MANBECK, JR.

Attesting Officer     Commissioner of Patents and Trademarks